(No Model.)
L. T. BOW.
THILL SUPPORTER.
No. 441,350. Patented Nov. 25, 1890.
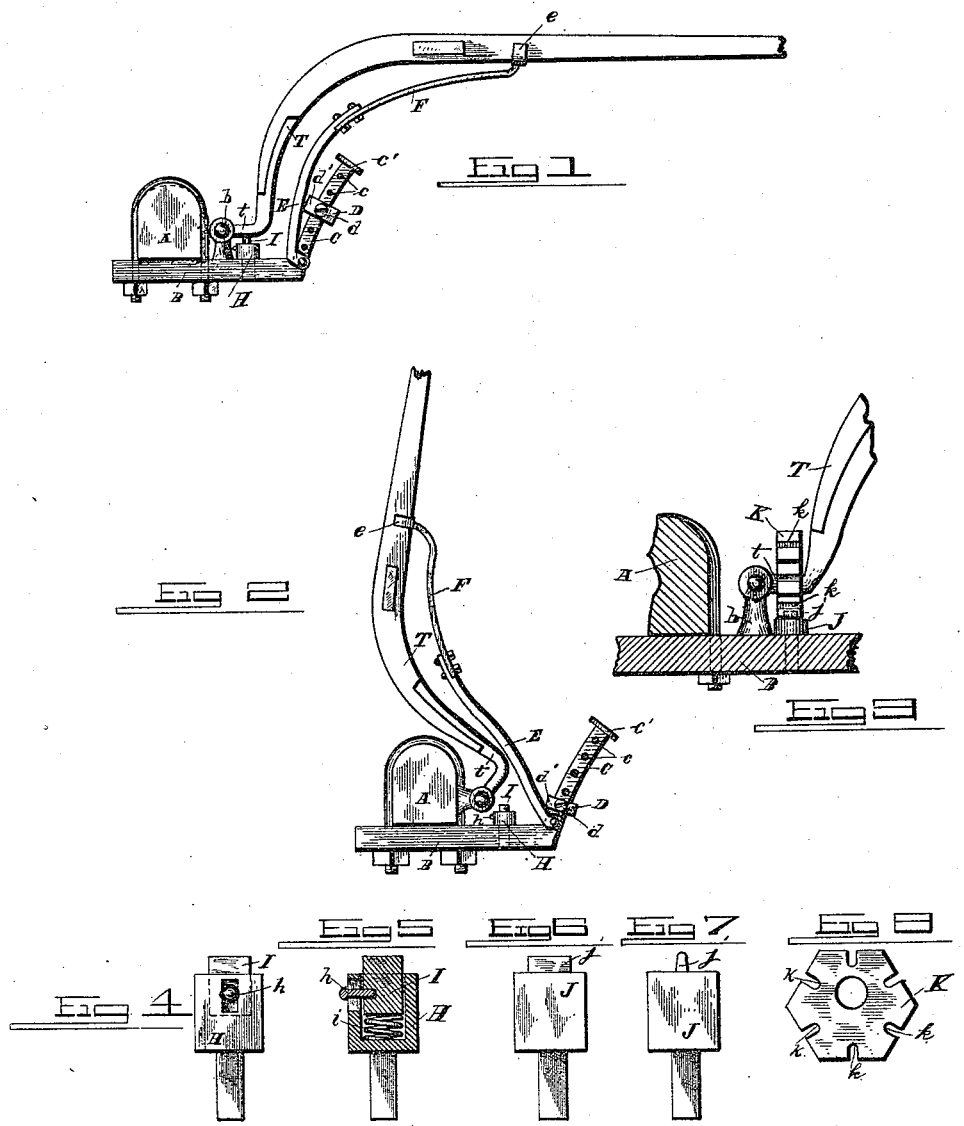
Witnesses
C. W. Seville,
Arthur E. Dowell
Inventor
L. T. Bow.
By his Attorney
T. H. Alexander

UNITED STATES PATENT OFFICE.

LAFAYETTE T. BOW, OF GLASGOW, KENTUCKY, ASSIGNOR OF ONE-HALF TO MADISON T. PEDIGO AND ELAM T. MURPHY, OF SAME PLACE.

THILL-SUPPORTER.

SPECIFICATION forming part of Letters Patent No. 441,350, dated November 25, 1890.

Application filed April 23, 1890. Serial No. 349,077. (No model.)

*To all whom it may concern:*

Be it known that I, LAFAYETTE T. BOW, of Glasgow, in the county of Barren and State of Kentucky, have invented certain new and useful Improvements in Thill-Supporters; and I do hereby declare that the following is a full, clear, and exact description thereof, reference being had to the accompanying drawings, and to the letters of reference marked thereon, which form part of this specification, in which—

Figure 1 is a side view of my improved shaft-supporting and anti-rattling device. Fig. 2 is a similar view showing the shaft raised. Fig. 3 is a detail view showing a modified form of anti-rattling device. Figs. 4 and 5 are detail views of the anti-rattling device shown in Fig. 2. Figs. 6, 7, and 8 are detail views of the anti-rattling device shown in Fig. 3.

This invention is an improvement in shaft or thill supporting devices, and its object is to uphold the thills of a vehicle so that the animal hitched thereto will be relieved of all or the greater portion of the weight thereof when in harness, and the accidental dropping of the thills be prevented, and the same upheld when the animal is unhitched; and to this end the invention consists, essentially, in a spring-arm attached indirectly to the axle beneath the shaft or thill, and in a rigid arm and an adjustable piece thereon, whereby the position of the spring-arm is regulated.

The invention also has for its object to prevent rattling of the thills in their couplings, and all will be clearly understood from the following description and claims.

Referring to the drawings by letters, A designates a vehicle-axle; B, a metal plate lying transversely of and under the axle, and secured thereto by a clip and nuts, as shown. The plate projects forward slightly beyond the axle, and has rigidly attached to its outer end an upstanding forwardly-bent rigid arm C, curved somewhat like the rear end of the thill T, below which it stands.

D designates an adjustable collar slipped on arm C, and adjustably secured thereto by a set-screw $d$, which may be engaged with either of a series of sinks $c$ in arm C, and the arm may be headed, as at $c'$, to prevent the collar being slipped off. The collar has a short rearwardly-projecting stud $d'$, as shown, which impinges against the lower face of a rod E, which is curved similarly to arm C, and has its rear lower end pivotally attached to the front end of plate B at the junction of arm C therewith, and overlying the latter, but kept out of contact therewith by stud $d'$.

To the front end of rod E is attached one end of a flat spring F, which is curved forwardly and upwardly, and has a half-loop $e$ at its free end, in which rests the front portion of thill T. The thills are preferably attached direct to the axle, as suggested in Fig. 2, but may be connected to plate B by means of a bolt passing through upstanding perforated ears $b$ at the sides of the plate, and through the iron attached to the rear end of the thill, as shown. By slipping the collar upward on arm C rod E is allowed to lie close to said arm, holding the shafts in a horizontal position, but by lowering collar D on arm C the rod E is thrown or turned backward so that the shafts or thills will be raised, or can be thrown back and held upright. The spring F may be formed integral with rod E.

H represents a hollow block, which is secured to plate B just in front of the thill, and I is a loose plug in said block resting upon a spring $i$, which tends to project the plug. The plug is retained in the block by a pin $h$, which passes therethrough and through slots in the side of the block, as shown, permitting the plug to play vertically. This plug bears against the under side of the thill-iron $t$ and forces the same upward at all times, causing it to bind on its confining-bolt and preventing rattling.

In Fig. 3 the block H is replaced by a stud J, having a tooth $j$ on its top, and an eccentrically-bored angularly-faced rubber washer K is slipped on the thill-iron before the iron is fastened to the shaft, and the washer bears upon stud J, and thereby forces the thill upward, and to prevent the washer from turning it has notches $k$ in its faces which may engage tooth $j$, as shown.

The arm A, bar B, and springs C are bent to suit the curves of the thills of the vehicle to which they are attached, and a holding device is provided for each thill.

Having described my invention, what I claim as new, and desire to secure by Letters Patent thereon, is—

1. The combination of the upstanding arm attached to the axle, the adjustable collar thereon, and the thill or shaft, with a rod interposed between the thill and arm and rendered adjustable by the collar, substantially as and for the purpose described.

2. The combination of the plate attached to the axle, the upstanding arm at the front end thereof, and the thill, with the curved rod pivotally connected to said plate and lying between the thill and arm, and the collar playing on said arm and regulating the position of said rod, for the purpose and substantially as specified.

3. The combination, with the thill and its iron and the hollow block H attached thereto, of the vertically-movable spring-controlled plug I, loosely confined in said block, and bearing against the thill-iron and exerting an upward pressure thereagainst, substantially as and for the purpose specified.

4. The combination of the plate clipped to the axle and having a curved upstanding arm at its front end and a collar on said arm, with a rod pivoted to said plate and overlying said arm and having a spring attached to its upper end to uphold a thill, substantially as set forth.

5. The combination of the thills, the upstanding arm, and the spring-rod for sustaining the thills, with the devices for forcing the thill-irons upward, constructed substantially as described, all as and for the purpose specified.

In testimony that I claim the foregoing as my own I affix my signature in presence of two witnesses.

LAFAYETTE T. BOW.

Witnesses:
J. H. BULLOCK,
E. T. MURPHY.